Dec. 29, 1953  J. K. MURDOCK ET AL  2,664,096
WATER SERVICE FIXTURE
Filed Nov. 21, 1947  2 Sheets-Sheet 1

JOSEPH KELSO MURDOCK
EUGENE LEROY
HAROLD F. OSWALD
INVENTORS.

BY Zugelter & Zugelter
Attys.

Dec. 29, 1953  J. K. MURDOCK ET AL  2,664,096
WATER SERVICE FIXTURE
Filed Nov. 21, 1947  2 Sheets-Sheet 2
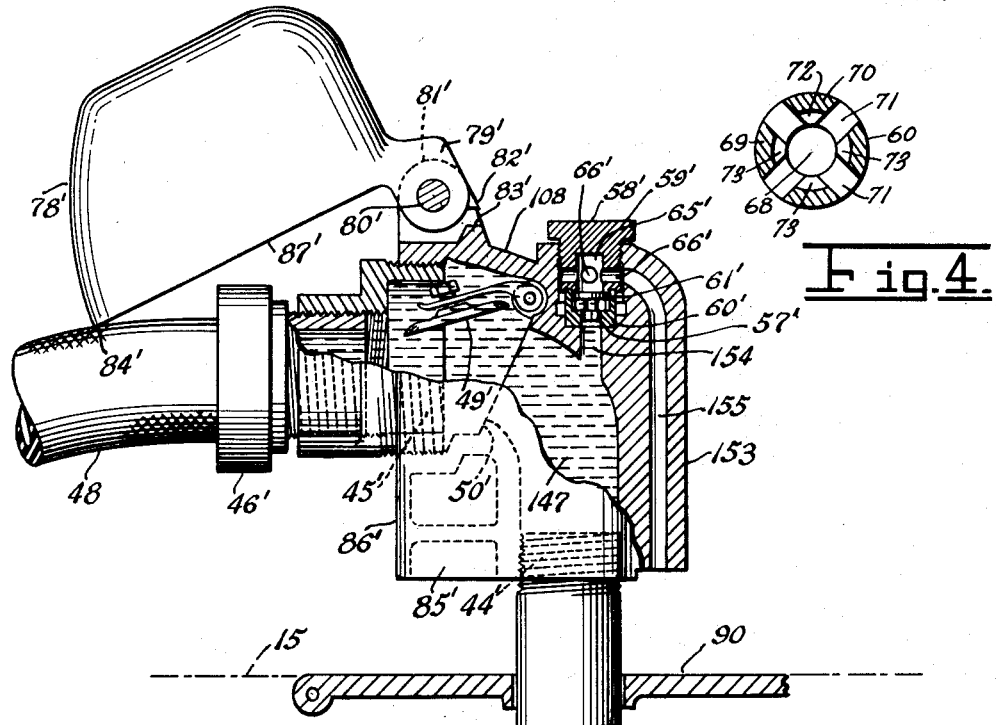
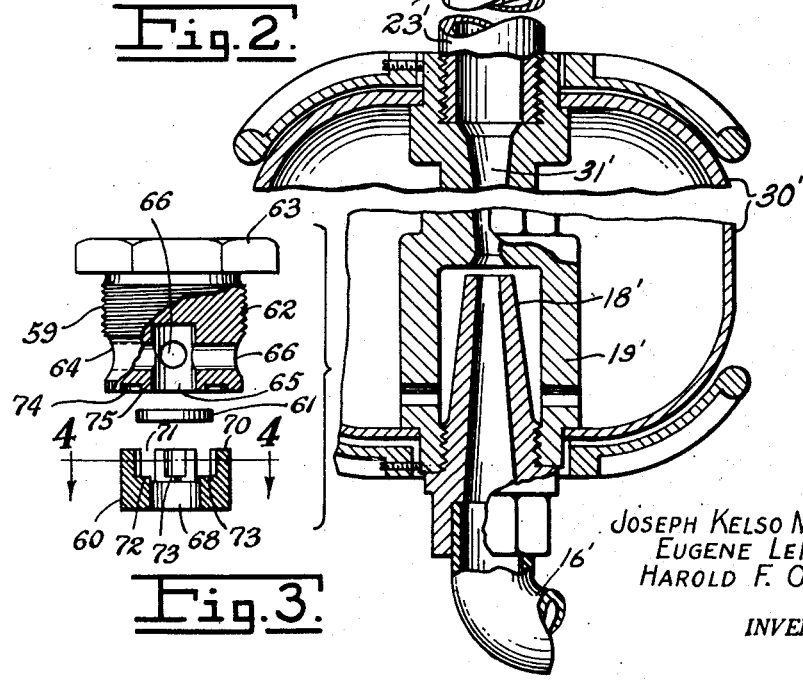
JOSEPH KELSO MURDOCK
EUGENE LeROY
HAROLD F. OSWALD
INVENTORS.
BY Zugelter & Zugelter
Attys.

Patented Dec. 29, 1953

2,664,096

UNITED STATES PATENT OFFICE 2,664,096

WATER SERVICE FIXTURE

Joseph Kelso Murdock, Cincinnati, and Eugene Le Roy, St. Bernard, Ohio, and Harold F. Oswald, Dayton, Ky., assignors to The Murdock Mfg. & Supply Company, Cincinnati, Ohio, a corporation of Ohio Application November 21, 1947, Serial No. 787,270

1 Claim. (Cl. 137—218)

This invention relates to a water service fixture incorporating an improved construction whereby maximum protection is provided against freezing in various climates and against pollution by back-siphonage and cross-connection between the potable water supply and possible sources of waste and filth.

One object of the invention is to provide a water service fixture designed to meet the requirements of health department inspectors and others charged with the responsibility of protecting the public health against the effects of a polluted water supply system.

Another object is to provide a water service fixture arranged to preclude back-siphonage through a length of hose attached to the fixture and lying on the ground or platform surrounding the fixture.

Another object is to provide means in a water service fixture to preclude the draining of water in a length of flexible hose into the service fixture when the discharge end of the hose is elevated above the level of the service fixture.

A further object is to provide a device of the character referred to which is simple, relatively inexpensive, and thoroughly reliable in its functions of eliminating freezing and pollution of the potable water supply.

Still another object of the invention is to provide a fixture of the character stated which is so constructed as to withstand severe usage and abuse for extended periods of time, and which employs no delicate parts subject to breakage, injury or deterioration in service.

Another object is to provide in a water service fixture of the class described, an improved ejector action by means of an ejector substantially inclosed within a drainage reservoir.

The foregoing and other objects and advantages are attained by the means described herein and illustrated upon the accompanying drawings, in which:

Fig. 2 is an elevational view, partly in cross-section, of a modified form of the fixture head.

Fig. 3 is an enlarged exploded view, partly in cross-section, of the vacuum breaker valve which forms part of the invention.

Fig. 4 is a cross-sectional view of a valve disc holder, taken on line 4—4 of Fig. 3.

Figure 1:
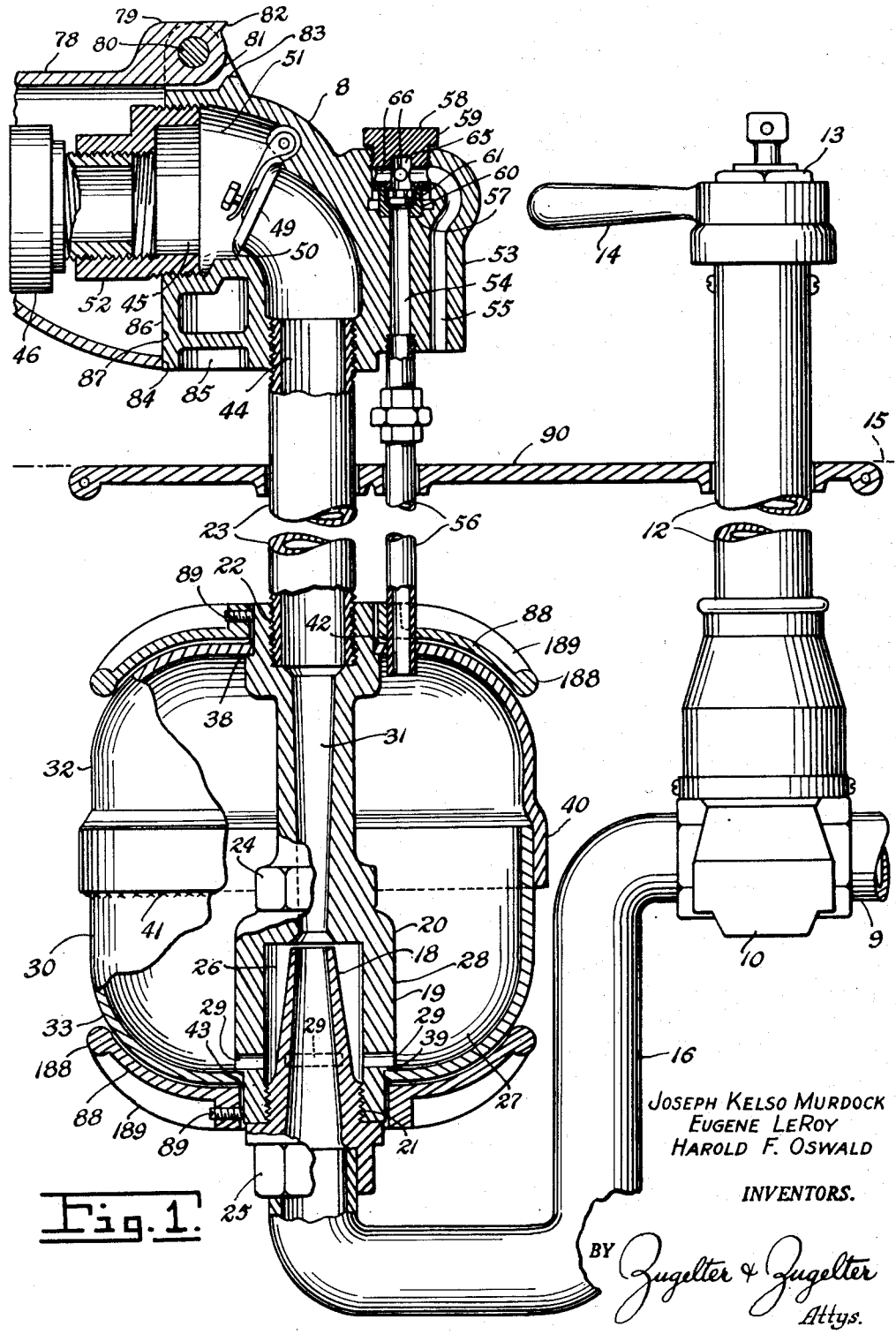
Fig. 1 is a fragmental elevational view of the fixture, largely in cross-section for clarity of disclosure.

Insuring water service fixtures against back-siphonage and other pollution-inducing action, and against freezing at low temperatures, has heretofore been a perplexing problem to those whose business it is to guard potable water distribution systems against pollution. The problem is found particularly difficult in railroad yards and other centers of activity where the surroundings are not usually sanitary. Although proposals for the solution of this problem have been numerous, and quite varied in the manner of approach, no practicable water service fixture has yet been produced to afford a completely satisfactory installation. The primary object of the present invention is to meet the freezing and pollution problems in a practical and highly satisfactory manner, with the use of equipment that is simple and reliable in its operation.

Referring to Fig. 1, the hydrant head is indicated at 8, while the fresh water supply pipe conveying potable water from a water main is shown at 9. The water supply pipe is connected to a valve 10, which may be of any suitable type, such as the plug type disclosed in the U. S. patent of S. J. Nordstrom, No. 1,781,821, dated November 18, 1930, and illustrated in elevation in Fig. 1 of the accompanying drawings. The many advantages of such a valve are specified in the patent aforesaid, and in various other patents of the same inventor. The valve 10 alternatively may be of the type shown in a pending application, Serial No. 694,601, entitled "Water Service Fixture," and filed on September 3, 1946, now Patent No. 2,598,488, May 27, 1952, by Thomas E. Bart.

Briefly stated, the valve shown in Fig. 1 comprises a body 10, and an operating tube or stem 12, the upper end 13 of which is squared to receive a wrench 14 by which the valve plug may be turned to open or close the valve, it being understood that the lower end of the tube or stem 12 is suitably secured to a valve plug encased within the valve body 10 to insure its opening and closing upon rotation of the squared end 13 by means of the wrench. Other details of the Nordstrom valve may be had by reference to the aforementioned Nordstrom patents. It is to be understood, of course, that the valve 10 is disposed under ground, below the frost line, the ground level being indicated at 15.

The outlet port of the valve 10 is connected with a pipe or tube 16, whereby water passing through the valve is conveyed to the constricted nozzle 18 of an ejector 19. The ejector may be of any acceptable type, the exemplified form comprising a body 20 internally bored and threaded as at 21 and 22 to receive respectively, the exteriorly threaded ejector nozzle 18 and the lower threaded end of the riser pipe 23. The nozzle 18, the ejector body 20, and the riser pipe 23 are preferably arranged in vertical axial alignment, as shown. The body 20 and the nozzle 18 may be fabricated with hexagonal portions 24 and 25, respectively, to provide wrench gripping means for threadedly connecting the ejector nozzle 18 with the ejector body 20.

The body 20 will be properly shaped exteriorly to assist the nozzle 18 in performing the desired ejector action. It will be noted that the nozzle 18 projects upwardly into an ejector chamber 26, the wall 28 of which is provided with a series of ports 29, communicating with the interior 27 of a tank or reservoir 30 which substantially encloses the ejector 19. Any water remaining in the riser 23 upon closing the valve 10, will gravitate through the tapered ejector bore 31 into the reservoir 30 by way of the chamber 26 and ports 29. In order that the ejector action which occurs about the nozzle 18 when the valve 10 is opened will result in withdrawing substantially all the water within the reservoir 30, the ports are preferably located at the lowermost part of the tank interior 27. Little or no water, therefore, will be found within the reservoir as long as there is a flow of water upwardly through the riser 23.

It is important to note that the interior of the reservoir 30 is never exposed to water other than the potable water which may drain from the riser 23, wherefore, it may be accurately stated that the reservoir forms part of the potable water supply line. Regardless of how often water may enter and leave the reservoir, it will never carry contamination or pollution into the operating elements of the hydrant head or supply line, so long as the water coming through the fresh water supply line 9 is pure and clean. The reservoir 30, with its enclosed ejector 19, like the valve 10, is embedded in the earth below the frost line, so as to prevent freezing during the winter season.

While the reservoir 30 may be of any desired configuration, the exemplified reservoir is formed of two cup-like members 32 and 33, the former inverted over the latter, as shown in Fig. 1. The members 32 and 33 are centrally apertured and are adapted to slip over the ends of the ejector body 20, in abutment against the shoulders 38 and 39 provided with a flared perimeter 40, adapted to overlap the perimeter of the second reservoir member in embracing relationship. Any suitable means, such as welding, soldering, or brazing, may be employed for rendering the reservoir 30 water tight at the central seam or joint 41 and at the upper and lower points 42 and 43, where the reservoir members are joined to the ejector body 20. So designed, the combination ejector and reservoir provides a more efficient ejector action than anything heretofore proposed, and at a lower cost of manufacture, since the entire combination comprises only four parts, namely: the ejector body 20, the ejector nozzle 18, and the two reservoir members 32 and 33. The rigidity of the structure and its ability to withstand abuse, are readily appreciated.

The hydrant head 8, as detailed in Fig. 1, comprises a hollow casting of substantial elbow shape, the ports 44 and 45 of which are internally threaded to receive the upper threaded end of the riser 23 and the hose coupling member 46, respectively. A flexible hose 48, shown in Fig. 2, may be coupled to the coupling member 46, for delivering potable water to coaches, dining cars and the like. Under certain circumstances, however, it may be desirable to affix a pipe or conduit to the head 8, instead of the hose 48.

A suitable flapper valve, such as shown at 49, may be pivotally disposed interiorly of the head 8, to gravitationally seat upon the annular seat 50 provided therefor. In order to permit an uninterrupted flow of water through the outlet port 45, a clearance for the flapper valve 49 may be provided in the upper interior part of the head 8, as indicated at 51. In order to provide for properly machining the flapper valve seat 50, the discharge port 45 may be of over-size diameter, interiorly threaded to accommodate an off-center reducer member 52, into which the hose coupling member 46 is threaded.

Therefore, when the valve 10 is opened, pressure of the water entering the head 8 will elevate the flapper valve 49 into the clearance area 51, thus providing an uninterrupted passage for the water through the discharge port 45. Release of the water pressure will, of course, cause the flapper valve to fall upon its seat 50, and thereby preclude water in the hose from siphoning into the reservoir 30 through the riser 23. This is important, since the capacity of the reservoir, though ample to receive the water in the riser 23, may be taxed to its limit if the water in a hose of considerable length is permitted to back-siphon into the reservoir 30 and riser 23, thereby causing the water to stand in the riser above ground level and freeze during sub-freezing weather.

The rearward integral extension 53 of the head 8 is provided with substantially vertical cored passages or channels 54 and 55, the former of which is connected with the interior 27 of the reservoir by means of the pipe or tube 56, the connections, of course, being leakproof. The passages 54 and 55 and the pipe 56 constitute part of a vacuum breaker which provides exceedingly free but protected communication between the outside atmosphere and the interior 27 of the reservoir.

At the top of the hydrant head extension 53 and in axial alignment with the vertical channel 54 is provided a vent check valve 58, which is detailed in exploded form in Fig. 3. The function of this vent check valve is to close or substantially close the vacuum breaker passage 55 during mild or non-freezing weather, when the main valve 10 is permanently left open and the flow of potable water is controlled by means of a service cock at the discharge end of the hose which is attached to the hydrant head 8.

As shown in Fig. 3, the vent check valve 58 comprises a transversely apertured cap 59, a disc holder 60, and a disc 61, the latter being fabricated of any suitable material, preferably fiber. The cap 59 is exteriorly threaded, as at 62, for engagement with cooperating threads in the head 8, and may be provided with a square or hexagon head 63 for ease in threading into position. A circumferential groove 64 is provided upon the cap 59 which is adapted to communicate with the inwardly turned upper terminus of the channel 55, as shown in Fig. 1. An upwardly extending central blind bore 65 is provided in the cap 59, and transverse apertures 66 in horizontal alignment with the groove 64 meet the central bore 65.

The disc holder 60 is substantially cylindrical in form, having a central bore 68 and a counter-bore 69. The wall 70 of the counter-bored portion is transversely slotted as at 71, the depth of the slots 71 extending slightly below the depth of the counter-bore shoulder 72, the latter providing a seat for the disc 61. Because of the depth of the slots 71, the counter-bore shoulder 72 assumes the form of a series of shallow coplanar triangles 73 upon which the disc 61 normally seats. When assembled, the upper face of the notched wall 70 of the disc holder, engages an annular groove 74 provided in the lower face of the check valve cap 59, said disc holder being suitably seated at 57, Fig. 1, in the hydrant head 8 in axial alignment with the vacuum breaker passage 54. An annular seat 75, concentric with the central bore 65, is provided on the lower face of the cap 59 against which the disc 61 seats to close the vacuum breaker passage 55 upon application of pressure to said disc from below.

As hereinbefore mentioned, the main valve 10 may be left open during non-freezing weather, the flow of water through the instant device being controlled by means of a service cock at the discharge end of the attached hose. It is obvious, therefore, that without the presence of the vent check valve 58, water would escape from the passage 55 during non-freezing weather when main valve 10 is left open, since water under pressure would be present at all times in all parts of the service fixture as long as the control valve at the end of the hose remained closed and the main valve 10 open.

Upon opening the service cock at the end of the hose, the ejector 18 will draw out or eject all the water in the reservoir. The instant the service cock is opened the disc 61 in the vent check valve 58 will drop upon its seat 73 and permit a small intake of air into the reservoir, thereby precluding the possibility of the reservoir's becoming water-logged and assuring complete withdrawal of the potable water in the reservoir. The intake air, which comes through the passage 55, circulates through the apertures 66 and central bore 65 of the cap 59, around and under the disc 61 through the slots 71, thence through the disc holder bore 68 into the reservoir interior by way of the passage 54 and associated pipe 56. As stated previously, the slots 71 are only slightly deeper than the upper surface of the valve disc seat 73, so that the amount of air entering therethrough is very small, thereby precluding the eructation of air when water is being discharged through the head 8, as would be the case if air entered the reservoir in voluminous amounts.

During sub-freezing weather, the hose attached to the head 8 is used without a service cock at its discharge end, the flow of water therethrough being controlled by means of the main valve 10 each time a delivery of water is desired. Upon opening the main valve 10, all water in the reservoir 30 will be ejected, as hereinbefore described, complete ejection being assured by virtue of the air intake through the vent check valve 58. Upon closing the main valve 10, the flapper valve 49 will fall upon its seat 50, thereby precluding back-siphonage of water remaining in the hose. Only the water in the riser 23 will gravitate into the reservoir. It is obvious, therefore, that during cold weather the reservoir 30 will receive only the water from the riser 23, which will be completely ejected upon again opening the valve 10. The reservoir is below the frost line, as previously stated.

For purposes of sanitation and anti-pollution, a pivoted self-closing hood 78 may be provided. A perforate lug 79, integral with the hood 78, carries a pin or bolt 80, which passes through axially aligned apertures provided in a pair of upstanding lips 81 formed integrally with the hydrant head 8. A rearward projection 82 may be provided on the hood lug 79 for contacting an abutment 83 between lips 81 to limit the upward movement of the hood 78, so that it may not tilt upwardly beyond dead center and thereby remain in open position. The hood, therefore, is self-closing, and when a hose is attached to the hose coupling 46, the hood's leading edge 84 rests upon the hose, as shown in Fig. 2. The forward end of the head 8 may be formed with a hollow extension 85 having a vertical wall 86 against which the edges 87 of the hood may abut when in closed position, as indicated in Fig. 1. As a result of this fitting of the hood 78 to the head 8, a substantial closure is effected for protecting the coupling member 46 when not in use, so that contaminating matter from passing cars may not reach the vital parts of the hydrant head and cause pollution of the water delivered therefrom for human consumption.

Suitable guard plates 88 may be provided for the reservoir at the top and bottom thereof, as shown in Fig. 1, as a protection against injury to the reservoir during handling and installation. The guard plates may be centrally apertured to slip over the ends of the ejector body 20, and are securely held against displacement by suitable means, such as set-screws 89. A heavy rim and a series of reinforcing radial ribs for the guard plates are indicated at 188 and 189, respectively. The diameter of each rim is at least as great as that of the reservoir.

To produce a serviceable and durable structure, omitting the objectionable features of a service box at platform level, a heavy plate 90 may be provided to support the riser 23 and the main valve casing 12 in spaced relationship approximately at ground or platform level 15. It may here be noted that the riser 23 and the casing 12 may extend to any desired elevation above the ground or platform level.

A modification of the hydrant head is shown in Fig. 2, wherein the head 108 is identical with the head 8 of Fig. 1 in all details except for the position of the vent check valve 58 and the arrangement of the vacuum breaker passages. The vertical passage 155 within the integral extension 153 of the head 108, together with the cored channel 154 within the head, constitutes part of a vacuum breaker which provides exceedingly free communication between the outside atmosphere and the interior 147 of the hydrant head. Portions of the hydrant shown in Fig. 2 which correspond to portions of the hydrant shown in Fig. 1 have been given the same reference numerals as the corresponding portions of the hydrant shown in Fig. 1 with the addition of a prime to each reference numeral.

The vent check valve 58 used in the head 8 of Fig. 1 is used in the modified head 108, being disposed in axial alignment with the cored channel 154. The disc holder grooves 71, Figs. 3 and 4, may be somewhat deeper for the vent check valve in order to provide a more copious intake of air for interior 147 of the head 108. The hydrant shown in Fig. 2 is provided with underground members including a supply pipe 16' which receives water from a valve (not shown). The valve may be identical in construction with the valve shown in Fig. 1. The supply pipe 16' directs water through an ejector nozzle 18' of an ejector 19' which directs the water up the riser of the hydrant. Ejector 19' is similar in construction to the ejector shown in Fig. 1. The ejector is surrounded by a reservoir 30' which is constructed to receive riser drainage when the supply of water to the riser is shut off.

The reservoir 30' in the fixture of Fig. 2 normally is in communication with the outside atmosphere by way of the riser 23' and the passages 154 and 155, whereas such communication in Fig. 1 is through the pipe 56 and the passages 54 and 55.

The function of the disc 61' is to close the vacuum breaker passages 154 and 155 when the disc is elevated against the vent check valve seat by pressure of water within the head, and to provide for free and ample intake of air through the same passages when the disc is lowered, with water pressure at atmospheric or sub-atmospheric value. Whenever the valve is opened, water pressure immediately elevates the disc 61' to close the vent check valve 59', as shown in Fig. 2, thereby precluding the leakage of water through the passage 155 and onto the ground or platform surrounding the fixture. Upon closing the main valve, the disc 61' drops to its seat, causing a rush of air into the head 108 to break the vacuum therein and permit gravitation of the riser water to reservoir 30'.

At the same time the flapper valve 49' closes upon its seat 50', to preclude entry of hose water through the riser 23' into the reservoir. In the event the hose 48 is raised above the elevation of the head 108, any water therein will be precluded from draining into the reservoir 30' by virtue of the flapper valve 49'; which is open only when a flow of water is passing through head 108 from the water supply line.

In both forms of the device as illustrated upon the drawings, the valve disc 61 is adapted to close the vacuum breaker passage when elevated, and to open the passage when lowered. The downward opening of the vacuum breaker passages 55 and 155 exteriorly of the hydrant head, is effective to preclude entry of dirt and filth into the fixture.

The construction is foolproof, inexpensive, and easy to install and maintain, with a resultant saving in expense to the user. The device is sturdy and durable, and will resist ordinary abuse to the utmost for year round service. No drainage need be provided for, either to the ground or to a sewer, thus eliminating the possibility of pollution through direct or indirect cross connections with contaminated sources.

It is to be understood that various changes and modifications are possible in the structural details of the device, within the scope of the appended claim, without deviating from the spirit of the invention.

What is claimed is:

An air-inlet water-check valve for a frost-proof hydrant which comprises a housing having two upright spaced passageways therein communicating at their upper ends, one of said passageways communicating with the water space of the hydrant, the lower end of the other passageway opening to the atmosphere, an upright counterbore in said housing extending into the point of communication between said two passageways, an annular member seated in said counterbore, said annular member having a plurality of spaced lugs at the periphery thereof extending upwardly toward the top of the counterbore, a plug in said counterbore said plug having a channel therethrough communicating with both passageways, there being a valve seat on the plug opposite the lugs, and a valve disk housed between the lugs and the plug, said disk closing the channel in the plug when water rises in the head and raises the disk against said seat to close the passage leading to the atmosphere, the disk resting on said lugs when the water level in the head is reduced to reestablish communication with the atmosphere.

JOSEPH KELSO MURDOCK.
EUGENE LE ROY.
HAROLD F. OSWALD.

References Cited in the file of this patent

UNITED STATES PATENTS

| Number | Name | Date |
|---|---|---|
| 680,383 | Kemp | Aug. 13, 1901 |
| 1,764,926 | Bennett | June 17, 1930 |
| 1,846,623 | Volk | Feb. 23, 1932 |
| 2,199,657 | Bunch | May 7, 1940 |
| 2,292,674 | Terrell | Aug. 11, 1942 |
| 2,545,911 | Bart | Mar. 20, 1951 |
| 2,580,199 | Schmid | Dec. 25, 1951 |

FOREIGN PATENTS

| Number | Country | Date |
|---|---|---|
| 5,396 | Great Britain | of 1896 |
| 9,043 | Austria | of 1902 |
| 236,645 | Germany | of 1911 |